US011501575B1

(12) United States Patent
Smith

(10) Patent No.: US 11,501,575 B1
(45) Date of Patent: Nov. 15, 2022

(54) ILLICIT ACTIVITY DETECTION BASED ON BODY LANGUAGE

(71) Applicant: Securus Technologies, Inc., Carrollton, TX (US)

(72) Inventor: Matthew Smith, McKinney, TX (US)

(73) Assignee: Securus Technologies, Inc., Carrollton, TX (US)

( * ) Notice: Subject to any disclaimer, the term of this patent is extended or adjusted under 35 U.S.C. 154(b) by 140 days.

(21) Appl. No.: 15/901,942

(22) Filed: Feb. 22, 2018

(51) Int. Cl.
*G06K 9/00* (2022.01)
*G06V 40/20* (2022.01)
*G06V 20/52* (2022.01)
*G06V 40/16* (2022.01)

(52) U.S. Cl.
CPC .............. *G06V 40/23* (2022.01); *G06V 20/52* (2022.01); *G06V 40/165* (2022.01)

(58) Field of Classification Search
CPC ........... G06K 9/00342; G06K 9/00771; G06K 9/00248
See application file for complete search history.

(56) References Cited

U.S. PATENT DOCUMENTS

| 8,836,752 | B2 * | 9/2014 | Croak | H04L 12/1813 348/14.08 |
| 9,007,420 | B1 * | 4/2015 | Passe | H04N 7/147 348/14.01 |
| 9,106,789 | B1 * | 8/2015 | Shipman, Jr. | H04N 7/147 |
| 9,723,040 | B1 * | 8/2017 | Lubbehusen | H04L 67/02 |
| 2012/0281058 | A1 * | 11/2012 | Laney | H04N 7/15 348/14.03 |
| 2013/0108034 | A1 * | 5/2013 | Colbert | H04M 3/566 379/202.01 |
| 2014/0334610 | A1 * | 11/2014 | Hangsleben | H04M 3/2218 379/32.01 |
| 2017/0264739 | A1 * | 9/2017 | Smith | H04M 3/2281 |
| 2017/0324927 | A1 * | 11/2017 | Hodge | H04L 65/1069 |
| 2019/0037247 | A1 * | 1/2019 | Hodge | H04N 21/214 |

* cited by examiner

*Primary Examiner* — Tom Y Lu
(74) *Attorney, Agent, or Firm* — Fogarty LLP

(57) ABSTRACT

Systems and methods for detecting illicit activity based on body language features identified during a video visitation session or video communication are described herein. In some embodiments, a system may include a processor and a memory coupled to the processor, the memory having program instructions stored thereon that, upon execution by the processor, cause the system to: analyze a video communication between a first party and a second party, where the analysis is configured to detect a body language feature that indicates an event taking place during the communication; and create an electronic record identifying the communication as containing the event.

19 Claims, 4 Drawing Sheets

ILLICIT ACTIVITY DETECTION BASED ON BODY LANGUAGE

BACKGROUND

Correctional departments that are responsible for hosting incarcerated inmates are continually developing methods and activities to rehabilitate the inmates before their release back into society. One activity thought to aid in that transition is communication with friends and family outside the correctional facility. By allowing inmates to have contact with friends and family while incarcerated, the justice system hopes to maintain friendships and family relationships with people who will facilitate the inmate's transition back into society upon release. Traditional forms of contact include letter writing, telephone calls, in-person visitation, etc. More recently, technological advances have allowed jails and prisons to provide other types of visitation, including "video visitation" (e.g., video conferences and online chat sessions) between inmates and their friends and family who are outside the correctional facility. These video conferences allow friends and family to visit the inmate without having to travel to the correctional facility and/or without having to move the inmate to a visitation room in the facility.

SUMMARY

For a traditional in-person visit at a correctional facility, inmates are brought to a visitation area within the facility to meet with friends and family during the visit. This requires staff (e.g., guards or correctional officers) to escort the inmates from their cell or pod to the visitation area. Additional staff is required to observe the inmates during the visit.

Video visitation sessions, on the other hand, may be initiated from many different areas in the facility—at a video visitation terminal, in a video visitation room, or anywhere via a tablet computer. If the video visitation occurs in a secure area away from visitors, such as in the inmate's pod or a cell, then there is likely no dedicated monitoring of the session by the staff. Instead, the inmate would be subject to typical monitoring for that area of the facility. Additionally, direct supervision of friends and family during video visitation sessions is not possible since they are remote form the facility. Consequently, there is a need to automatically monitor video visitation sessions for illicit activity and/or communications.

Embodiments disclosed herein can provide for systems and methods for detecting illicit activity based on body language features identified during a video visitation session or video communication. In some embodiments, a system may include a processor and a memory coupled to the processor, the memory having program instructions stored thereon that, upon execution by the processor, cause the system to: analyze a video communication between a first party and a second party, where the analysis is configured to detect a body language feature that indicates an event taking place during the communication; and create an electronic record identifying the communication as containing the event.

In some embodiments, first party may be a resident of a correctional facility, and wherein the second party may be a non-resident of the correctional facility. The analysis may be performed while the communication is ongoing. Additionally, or alternatively, the analysis may be performed after the communication has concluded. Moreover, the event may be a communication that concerns criminal activity.

In some cases, the body language feature may include the first party's leaning in toward a video camera. Additionally, or alternatively, the body language feature may include the first party's changing stance. Additionally, or alternatively, the body language feature may include the first party's speed of movement being above or below a threshold value. Additionally, or alternatively, the body language feature may include the first party's covering of a body part. Additionally, or alternatively, the body language feature may include the first party's uncovering of a body part. Additionally, or alternatively, the body language feature may include changes to the first party's: pupil, eyebrow, or nostril.

In another illustrative, non-limiting embodiment, a method may implement one or more of the aforementioned operations. In yet another illustrative, non-limiting embodiment, a hardware memory device may have program instructions stored thereon that, upon execution by a computer system, cause the computer system to perform one or more of the aforementioned operations.

The foregoing has outlined rather broadly features and technical advantages of some embodiments disclosed herein in order that the detailed description that follows may be better understood. Additional features and advantages will be described hereinafter which form the subject of the claims of the invention. It should be appreciated that the conception and specific embodiments disclosed may be readily utilized as a basis for modifying or designing other structures for carrying out the same purposes of the present invention. It should also be realized that such equivalent constructions do not depart from the invention as set forth in the appended claims. The features of some embodiments, together with some objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Reference will now be made to the accompanying drawings, wherein.

Figure 1:
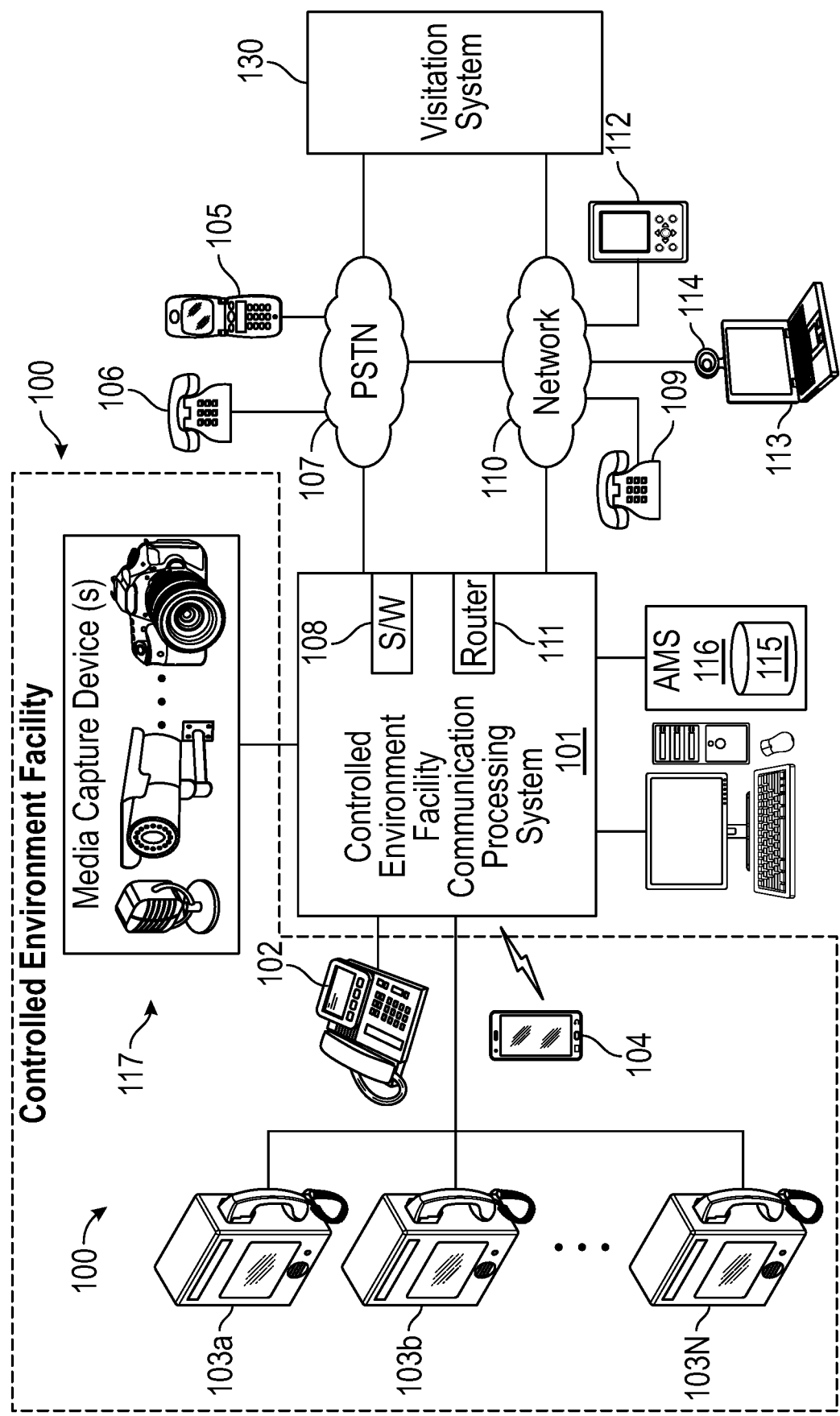
FIG. 1 is block diagram of an example of a system configured to provide communication services to a controlled-environment facility in accordance with some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

Some embodiments now will be described more fully hereinafter with reference to the accompanying drawings. Embodiments may take many different forms, and this disclosure should not be construed as limited to the embodiments set forth herein.

This specification discloses systems and methods for detecting illicit activity based on body language features identified during a video visitation session or video communication. In some embodiments, a video visitation communication between a resident and a non-resident of a controlled-environment facility may be analyzed to detect a body language feature. For instance, while carrying out a video visitation, and before saying something potentially incriminating, inmates tend to lean forward toward the video camera, either as a mannerism or to avoid being overheard by other inmates or guards in their vicinity. In this case, "leaning forward" is an example of a body language feature that, once detected, can then trigger the creation of an electronic record flagging or otherwise identifying the video visitation for subsequent action.

Once a body language feature has been detected, various actions may be taken. For example, the communication can be recorded and a flag may be stored indicating that the body language feature was detected. The flag can assist monitoring and/or investigative efforts to identify communications that contain the body language feature, which may be indicative of an attempt to communicate information relating to illicit or criminal activities and/or a provocation of a participant of the communication. Further, an alert may be sent to authorized personnel when a body language feature is detected, and/or the communication may be terminated when a body language feature is detected.

Various types of controlled-environment facilities are present today, and persons may be voluntary or involuntary residents of such facilities, whether temporarily or permanently. Examples of controlled-environment facilities may include correctional institutions or facilities (e.g., municipal jails, county jails, state prisons, federal prisons, military stockades, juvenile facilities, detention camps, home incarceration environments, etc.), healthcare facilities (e.g., hospitals, nursing homes, mental health facilities, assisted living quarters, rehabilitation clinics, such as drug and alcohol rehabilitation facilities, etc.), restricted living quarters (e.g., hotels, resorts, camps, dormitories, barracks, etc.), and the like.

For convenience of explanation, various examples discussed herein are presented in the context of correctional facilities. For instance, in some of the implementations discussed below, a controlled-environment facility may be referred to as a jail or prison, and its residents may be referred to as arrestees, detainees, or inmates. It should be understood, however, that the systems and methods described herein may be similarly applicable to other types of controlled-environment facilities and their respective residents (e.g., a hospital and its patients, a school dormitory and its students, etc.).

Particularly, in other implementations, body language detection techniques described herein may be used to identify problems in environments other than correctional facilities, such as in call centers, bus/train stations, airports, etc. And, in those cases, the systems and methods described herein may operate in the absence of any controlled-environment system.

FIG. 1 is block diagram of an example of a system configured to provide communication services to a controlled-environment facility according to some embodiments. As shown, communication processing system 101 may provide telephone services, videoconferencing, and/or other communication services to a controlled-environment facility 100. The communication processing system 101 may be implemented by one or more computer systems, an example of which is described below. In some cases, communication processing system 101 may be located in or remote from the controlled-environment facility 100. In some cases, communication processing system 101 may be centrally or remotely located with respect to one or more controlled-environment facilities and/or may provide communication services to multiple controlled-environment facilities.

More generally, however, it should be noted that communication processing system 101 may assume a variety of forms, and may be configured to serve a variety of facilities and/or users, whether within or outside of a controlled-environment facility.

One or more resident communication devices are in the controlled-environment facility 100. In the illustrated example, the controlled-environment facility 100 includes one or more telephones 102, one or more smart terminals 103, and one or more personal computer wireless devices 104. In the illustrated example, the telephone 102 can be a digital telephone, such as implementing Voice over Internet Protocol (VOIP) communications, or another telephone. In some embodiments, the smart terminal 103 may be implemented as a computer-based system. For example, a smart terminal 103 may include a display (e.g., a touch-screen display or other electronic display), camera (e.g., a webcam), and handset. A handset may be similar to a traditional telephone handset including an earpiece portion (with a loudspeaker), a handle portion, and a mouthpiece portion (with a microphone). The smart terminal 103 can enable telephone calls via the traditional telephone handset. The smart terminal 103 may further include audio and videoconferencing capabilities, which may enable residents to participate in video visitation sessions with non-residents of the controlled-environment facility 100 via video call, secure online chat, etc. The smart terminal 103 can enable other forms of communication, such as emails, text messages, etc. Generally speaking, a smart terminal 103 may be disposed in a visitation room, in a pod, kiosk, etc. The personal computer wireless device 104 can be or include a tablet computing device, a laptop computer, a wireless smart telephone, and/or another device. The personal computer wireless device 104 can enable telephone calls, videoconferencing, emails, text messaging, and/or other communication formats.

Under control of communication processing system 101, the resident communication devices (e.g., devices 102-104) of the controlled-environment facility 100 may be capable of communicatively connecting to an outside communication device, such as a device of a non-resident of the controlled-environment facility 100. The resident communication device may be communicatively coupled to an outside communication device through the communication processing system 101 to enable communications via, for example, calls, videoconferences, emails, text messaging, online chats, etc. As illustrated, the resident communication devices (e.g., devices 102-104) are communicatively coupled to the communication processing system 101. The communication processing system 101 includes a switch 108 that communicatively couples the communication processing system 101 to a Publicly Switched Telephone Network (PSTN) 107. A wireless mobile telephone 105 and a landline telephone 106 are communicatively coupled to the PSTN 107. Hence, a resident communication device (e.g., device 102-104) may be communicatively coupled to the wireless mobile telephone 105 and/or the landline telephone 106 via the communication processing system 101, the switch 108, and the PSTN 107.

The communication processing system 101 also includes a router 111 that communicatively couples the communication processing system 101 to a data network 110, such as a Wide Area Network (WAN), Local Area Network (LAN), the Internet, and/or a combination thereof. A digital telephone 109, a mobile computing device 112 (e.g., a mobile smart telephone, tablet, etc.), and a personal or laptop computer 113 (e.g., with a camera 114) are communicatively coupled to the data network 110. Hence, a resident communication device (e.g., device 102-104) may be communicatively coupled to the digital telephone 109, the mobile computing device 112, and/or the personal or laptop computer 113 via the communication processing system 101, the router 111, and the data network 110. A network connection between a resident communication device and an outside communication device through the data network 110 may be established and supported by an organization or commercial service that provides computer services and software for use in telecommunications and/or VOIP, such as SKYPE. Additionally, or alternatively, the controlled-environment facility 100 and/or the destination may use videoconferencing equipment compatible with ITU H.323, H.320, H.264, and/or V.80, or other suitable standards.

In addition to providing certain communication operations, communication processing system 101 may permit processing of communications to restrict aspects of communications and/or to obtain information from communications. As illustrated, Administration and Management System (AMS) 116 maintains database 115, and is communicatively coupled to the communication system 101. The AMS 116 may be implemented by one or more computer systems. The AMS 116 may be co-located with and/or located remotely from the communication processing system 101. The AMS 116 may store account information corresponding to each resident of the controlled-environment facility 100 in the database 115. The communication processing system 101 may access account information of a resident from the AMS 116 (and the database 115) when processing a communication from that resident.

As an example, in the context of a correctional facility, the database 115 may include account information for each resident the resident's Pre-Approved Contact (PAC) list and Resident Profile Data (RPD) information. The PAC list may include identities, devices, phone numbers, etc. of non-residents with whom the resident is permitted to communicate (e.g., a whitelist) or with whom they are prohibited from communicating (e.g., a blacklist). The RPD information may include, for example: balances for inmate trust and calling accounts; trial schedule; conviction data; criminal record; sentencing data, such as time served, time remaining to be served, and release date; cell and cellmate assignments; inmate restrictions and warnings; commissary order history; telephone call history; call recordings; known or suspected gang or criminal affiliations; known or suspected affiliates, accomplices, or gang members; and/or any other information that may be relevant or useful to correctional facility staff to house and maintain inmates.

When a resident attempts to initiate a communication, such as a telephone call, videoconference, etc., through a resident communication device (e.g., device 102-104), the resident may be prompted by the communication processing system 101 to provide identification information, such as a PIN and/or biometrics (e.g., a voice sample, facial image, fingerprint, etc.). The identification information may be provided through the resident communication device and/or a media capture device 117 communicatively coupled to the communication processing system 101. The media capture device 117 may be part of an existing security surveillance infrastructure within the controlled-environment facility 100. In other cases, a media capture device 117 may be installed in physical proximity to resident communication devices (e.g., in a visitation room or in the same pod, wing, etc.) but be nonetheless distinct from those communication devices. For example, a PIN may be input through a keypad of the resident communication device (e.g., a punch pad or a touch screen pad).

Further, as an example, biometrics like a voice sample may be provided through a microphone of the resident communication device and/or a microphone of a media capture device 117. Similarly, as an example, a facial image may be provided by a camera of the smart terminal 103 or personal computer wireless device 104 and/or by a camera (e.g., still capture and/or video camera) of the media capture device 117.

With the identification information, the communication processing system 101 can compare the identification information against account information stored in the database 115 to identify which resident is initiating a communication and which corresponding account information to use to process the communication. For example, a PIN provided through the resident communication device can be compared to a PIN stored as account information, and/or a biometric sample can be compared to a corresponding biometric signature stored as account information.

In some examples, with the account information identified, the communication processing system 101 may attempt to ensure that the resident's communications (e.g., telephone calls, videoconferences, etc.) are performed only with non-residents whose identities, devices, phone numbers, etc. are listed in that resident's PAC list stored on the database 115. The communication processing system 101 may prohibit attempts to initiate communication with a non-resident whose identity, device, phone number, etc. is not included in the PAC list.

If the non-resident is included in the resident's PAC list (and/or if other conditions are satisfied, such as sufficient funds in a calling account), the resident is permitted to initiate and communicate with the non-resident via the communication processing system 101. In some embodiments, when a communication (e.g., a telephone call, a videoconference, etc.) between a resident and a non-resident takes place via communication processing system 101, a record of that communication is created in the form of a Communication Detail Record (CDR), also known as a Communication Data Record. In some cases, a CDR may include a type of record made from a video, also referred to as a Video Detail Record (VDR). A CDR can include a record produced by a telecommunications device that contains attributes that are specific to a communication of any type handled by that device.

As such, communication processing system 101 may maintain a record of data for each communication between resident communication devices (e.g., devices 102-104) and outside communication devices (e.g., devices 105, 106, 109, 112, or 113) in a database, such as the database 115. Specifically, communication processing system 101 may maintain CDRs for communications made to or from resident communication devices. In some cases, a separate CDR may be created for each communication. For example, a CDR may identify the resident by name, account number, or another identifier. Also, a CDR may include information to identify the source and destination of the communication, such as a called and calling telephone number or Internet Protocol (IP) address.

For calls originated by residents, the particular resident communication device used by the resident may be identified as well as the particular destination device. Additionally, or alternatively, a CDR may include call routing data that identifies PSTN, data, and/or wireless networks used for a communication. The name or identity of the party initiating the communication, if it is not the resident, may also be recorded. Moreover, billing data, such as information used to pay for the communication may be recorded. For example, a call may be paid for using collect call billing, a calling card account, prepaid account, a commissary account, or charges to the called or calling party's Local Exchange Carrier (LEC).

A CDR may further include a digital media file and/or a reference to a digital media file stored in a database. Examples of digital media files include, but are not limited to, still photograph(s), video, and/or audio. These media files may be obtained or captured, for example, directly via smart resident communication devices, such as the smart terminal 103 and personal computer wireless device 104, operated by a resident. Additionally, or alternatively, digital media files may be obtained or captured by dedicated media capture devices 117 (e.g., cameras, camcorders, microphones, audio recorders, etc.). Additionally, or alternatively, digital media files may be captured by the outside communication device (e.g., devices 113 and 114) of a non-resident with whom a resident of the controlled-environment facility 100 is communicating.

Once captured by the resident communication smart device and/or media capture devices 117, one or more media files may be added to a CDR. In some implementations, the media file may itself be included in the CDR. Additionally, or alternatively, a reference or path to the data file stored elsewhere may be added to the CDR. Also, communication processing system 101 may add the biometric-based identification of parties to the CDR. The exact format of the CDR, as well as its attributes, may vary and/or may be configurable by an administrator or user.

Furthermore, the communication is recorded, and a copy of the recording or a reference to the copy of the recording may be stored in the CDR real-time for later review and analysis. In other cases, the communication may be transcribed, and the transcription may also be stored in the CDR.

The communication processing system 101 is operable to analyze video and audio in the communication. The communication processing system 101 may analyze the video and/or audio while the communication is on-going and/or after the communication has concluded. The communication processing system 101 is operable to determine body language features and/or volume level changes in the audio of the communication. Body language features and/or volume level changes may be indicative of events of interest.

With respect to body language features, for example, a "leaning in" or "leaning forward" motion by a participant to the communication may indicate an attempt to communicate information relating to confidential or illicit activities that the participant does not want to be overheard by others. The communication processing system 101 may detect body language features based on the communication individually and/or based on some number of previous communications.

To identify a body language feature, the communication processing system 101 may create one or more video streams for the participants of the communication. In some embodiments, an algorithm may first apply, to each video stream, a texture suppression filter and a background smoothing filter. Contour extraction may be obtained using image segmentation techniques. Then, a matching algorithm may be used to perform motion and/or image recognition against a set of templates. In various implementations, the use or contours enable the efficient use of lossless compression, as suitable for local processing in small computing devices (e.g., tablets).

To identify a body language feature based on previous communications, in some examples, a signature profile can be created based on the previous communications that is compared to the communication that is being analyzed for a potential body language feature. For example, using previous communications, an outline of a natural or default stance may be determined for an individual participant, which may later be used to identify the presence of a different stance (e.g., a different weight-bearing leg or bent knee), and/or a "leaning forward," "leaning in," "leaning backward," or "leaning out" body movement of that individual participant during at least a portion of an ongoing video visitation. In such a scenario, the signature profile can be stored in a database, such as part of account information of that participant stored in the database 115. In other examples, the signature profile can be global to any participant.

In some cases, the communication processing system 101 may also create one or more respective audio streams for the participants of the communication. Each audio stream may isolate when one respective participant is speaking during the communication, and may remove or filter any background noise from the communication. A volume level change can be identified, for example, to determine whether the audio changes coincide with the detection of the body language feature.

In further examples, to identify a body language feature, the communication processing system 101 may implement a machine learning algorithm, such as an Artificial Neural Network (ANN), Support Vector Machine (SVM), and/or other algorithms. Video streams from previous communications may be classified as positive classification (a match) or a negative classification (not a match), such as by an initial human analysis during a training phase. The positive and negative classifications can then be used by the machine learning algorithm to create a structure to identify positive and negative instances in video streams. The video streams from the previous communications may be specific to one person and/or may be based on video streams from multiple people. Using the machine learning algorithm, the communication processing system 101 may process isolated video streams of on-going and/or concluded communications to identify a positive instance (where the body language feature is present) and a negative instance (where the body language feature is absent).

When the communication processing system 101 detects a body language feature, the communication processing system 101 can create and store a flag in the CDR of the communication. In many cases, such a flag can indicate that a body language feature occurred in the communication.

The flag can also indicate, for example, whether the detected body language feature has been classified as: a leaning in, a leaning out, a change of stance, a number of stance changes per time period, a speed of movement above or below a threshold value, a covering of a body part (e.g., a cusped hand over the mouth or ear), an uncovering of a body part (e.g., genitals), suggestive or expletive gestures (e.g., punching air, middle finger, grabbing crotch, etc.), changes to a participant's pupils, eyebrows, or nostrils, etc.

The flag can include, for example, a time stamp indicating where in a video of the communication that the body language feature occurred. Further, the flag can include a pointer to a location in an electronic file of the recording of the communication where the body language feature occurred. The pointer may enable authorized personnel to, for example, click a link, control, or button in a user interface on a computer system (e.g., a monitoring or investigative system) that starts replay of the recording of the communication via the user interface at the instance in the communication where the body language feature occurred.

Additionally, or alternatively, when the communication processing system 101 detects a body language feature in a communication, the communication processing system 101 can send an alert to authorized personnel. The alert can be in the form of a call, a text message, an email, etc. transmitted to a device of authorized personnel, such as a telephone, a computer system, etc. If the alert is transmitted while the communication is on-going, the device of the authorized personnel may be communicatively coupled to the on-going communication, such as by being videoconferenced into the communication through a user interface of a monitoring system.

The device of the authorized personnel may be enabled to remotely listen to the communication while being muted, to barge into the communication to speak to one or more of the participants (which may mute communications to another participant), to terminate the communication (such as by pressing a designated button on a telephone keypad or a button on a user interface of a monitoring system), and/or other actions. If the alert is transmitted while the communication is on-going and/or after the communication has concluded, the alert may indicate to the authorized personnel which communication contained a body language feature for investigation.

Additionally, or alternatively, when the communication processing system 101 detects a body language feature in a communication, the communication processing system 101 can terminate the communication. In some instances, a resident may possess sensitive information that authorized personnel do not want communicated. Hence, a body language feature may indicate that the resident is beginning to communicate that sensitive information, so the communication processing system 101 can terminate the communication in an attempt to prevent communication of that information.

One or more monitoring systems 118 are communicatively coupled to the communication processing system 101. The monitoring system 118 may be implemented by one or more computer systems, an example of which is described below. In some cases, the monitoring system 118 may be located in or remote from the controlled-environment facility 100, and/or located with or remote from the communication processing system 101. In some cases, monitoring system 118 may be centrally or remotely located with respect to one or more controlled-environment facilities and/or may provide communication services to multiple controlled-environment facilities. More generally, however, it should be noted that monitoring system 118 may assume a variety of forms, and may be configured to serve a variety of facilities and/or users, whether within or outside of a controlled-environment facility.

The monitoring system 118 may be used by authorized personnel to access on-going (i.e., real-time) and/or concluded communications for monitoring and/or investigative purposes. Alerts may be transmitted to the monitoring system 118 when body language features are detected by the communication processing system 101. Further, the monitoring system 118 may enable querying the database 115 via the communication processing system 101 for information contained in CDRs, recorded communications, etc. Access to communications and/or playback of communications may be enabled by the monitoring system 118.

Figure 2:
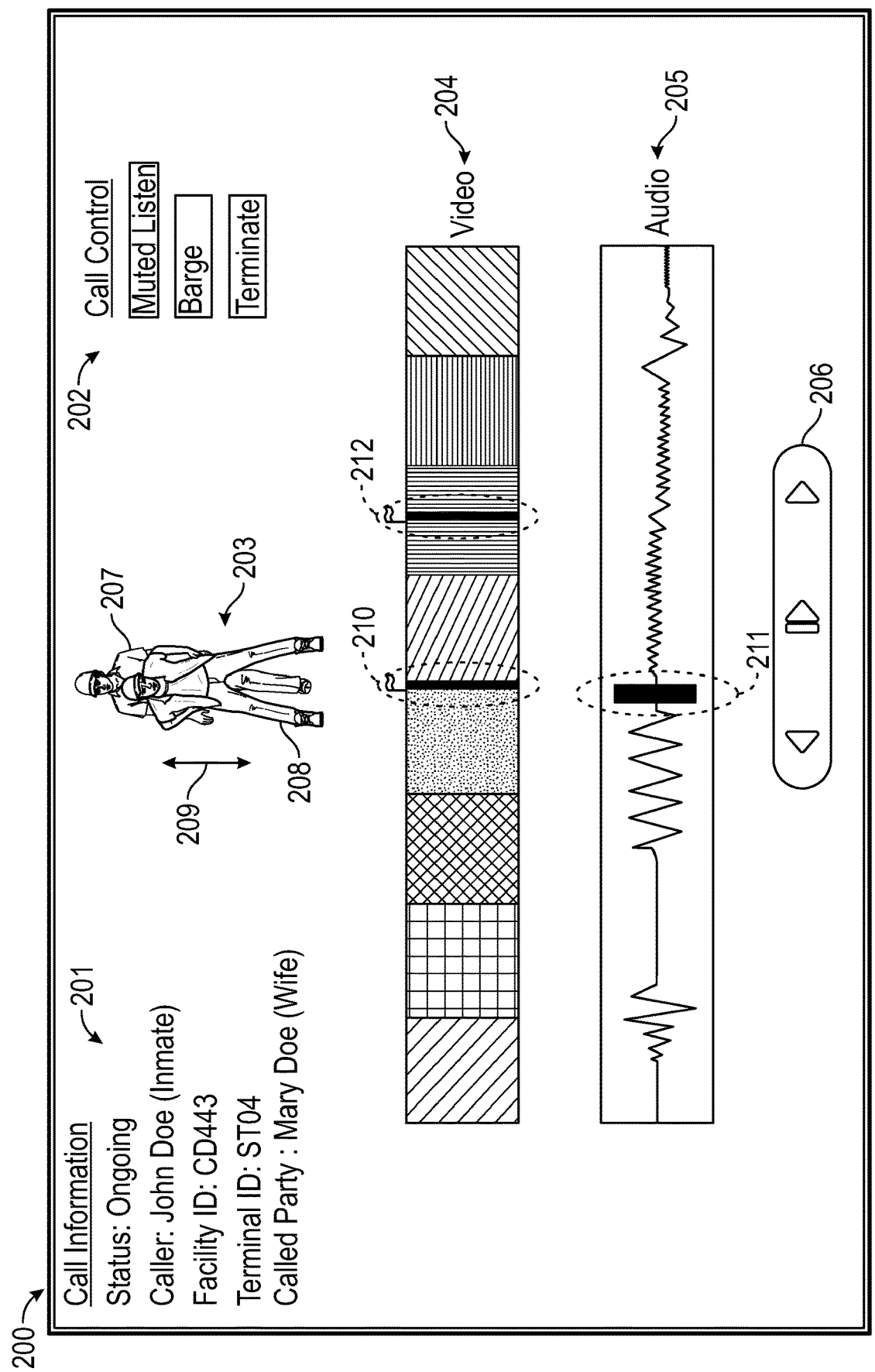
FIG. 2 is an example user interface of a monitoring application of a monitoring system in accordance with some embodiments.

FIG. 2 illustrates an example user interface 200 of a monitoring application of a monitoring system in accordance with some embodiments. The user interface 200 in this example is for monitoring video visitation sessions of inmates of a correctional facility. Particularly, the user interface 200 can be, for example, a portion of a monitoring application that provides access to communications for monitoring and/or investigative purposes to authorized personnel.

The user interface 200 may be accessed during the regular course of monitoring and/or investigating and/or after an alert is received by authorized personnel, for example. In some examples, the monitoring application enables authorized personnel to query a database of CDRs for CDRs that include a flag indicating a body language feature detection and/or an audio volume level change during the call. The monitoring application provides a list of CDRs responsive to the query, and the authorized personnel may select (e.g., click on) a given one of the CDRs to initiate the user interface 200 in the monitoring application.

The user interface 200 includes a call information area 201 and a call control area 202. The call information area 201 can include information relating to the video visitation or videoconferencing session, which may be populated from the CDR of the call. The call information area 201 includes an indication of the status of the communication, such as whether the communication is on-going (as illustrated in FIG. 2) or concluded. The call information area 201 further includes information relating to the participants of the communication, such as the calling party and the called party. The call information area 201 also includes additional information relating to the inmate (e.g., the resident) such as the facility identification where the inmate is incarcerated and the identification of the device (e.g., a smart terminal 103) used for the communication. Other information may be included in the call information area 201, while some illustrated information may be omitted in other examples.

The call control area 202 includes buttons that permit authorized personnel to control one or more aspects of the video visitation communication while the session is on-going. In some examples, the buttons may be grayed out or removed from the user interface 200 when the communication has been concluded. As illustrated, the buttons allow authorized personnel to listen while being muted from the communication ("MUTED LISTEN"), to barge into the communication to speak with one or more of the participants of the call ("BARGE"), and to terminate the communication ("TERMINATE"). Other functionality may also be included, such as an ability to bookmark various events in a recording of the communication, which bookmarks may be stored in the corresponding CDR in the database.

The user interface 200 includes a playback area 203 for the video portion of the communication. In this case, an inmate has a natural stance 207 but, at a point during the communication corresponding to flag 210, the inmate has "leaned in" towards the video camera such that their body has assumed contour 208. In this case, if the discrepancy 209 between natural stance 207 and leaning stance 208 meets a threshold amount, flag 210 is automatically added to the CDR to indicate detection of this body language feature. For example, flag 210 may be added at a time during the communication corresponding to a particular location in film roll 204.

Film roll 204 can be a graphical representation of a media file used to record the communication using thumbnail still images from the video feed, and waveform 205 can be a graphical representation of an audio signal corresponding to the audio portion of the media file. When watching or listening to the communication, a current playback indication 210, 211, and/or 212 can be shown in the playback waveform 203. The current playback indication 210, 211, and/or 212 can default to the current dialogue of an on-going communication, at a beginning of the communication, or at any other instance in the communication (such as at a bookmark or flagged event). In some examples, the playback indications 210, 211, and/or 212 can be clicked and dragged to any instance in the playback waveform 210, 211, and/or 212 to playback the communication at that instance.

Event flags are shown on the playback indications 210, 211, and/or 212. These event flags may indicate an occurrence of a body language feature and/or a detected volume level change in the communication. In the illustrated example, event flag 210 includes a time stamp with a pointer to a location in the media file, such that the event flag 205 can be clicked by the authorized personnel to initiate playback of the body language feature and/or audio at that instance. It will be understood that any number of event flags, markers, or other highlighting can be used to indicate events of interest in a communication.

In some embodiments, a combination of body language feature and audio volume change detection techniques may be used. For example, user interface 200 may be used to determine whether a body language feature detected in video roll 204 coincides in time, within a selected margin, with a change in audio volume above or below a threshold value (e.g., to determine whether a "leaning in" has been followed by a lowering of the participant's voice). In this example, flags 210 and 211 located closely in time indicate a higher probability of a secret being conveyed at that time, compared to flag 212 standing alone (that is, without a counterpart audio feature in waveform 205).

In some implementations, each of flags 210-212 may be accompanied by a score, and each score may indicate the probability that illicit or criminal information is being conveyed at that time during the video visitation. Each flag's score may be based upon the magnitude of the departure from a signature, default, or expected range of body language features or audio volume. Moreover, a composite score may combine a body language score with an audio score. For instance, the same detected inappropriate body language that alone would receive a 40% score, when combined with a detected very low voice which would on its own receive a 50% score, may result in a composite 90% score. In various implementations, a quantification or scoring algorithm may be calibrated used machine learning, similarly as described above.

The user interface 200 can further include playback control buttons 206, such as play, pause, stop, fast forward, rewind, etc., that can be used to control playback of the communication. The user interface 200 can include other information, other functionality, and/or other aspects. For example, the playback waveform 203 can include other markers or event flags, such as detected words, detect actions (e.g., attempted call forwarding, etc.), and/or others.

Figure 3:
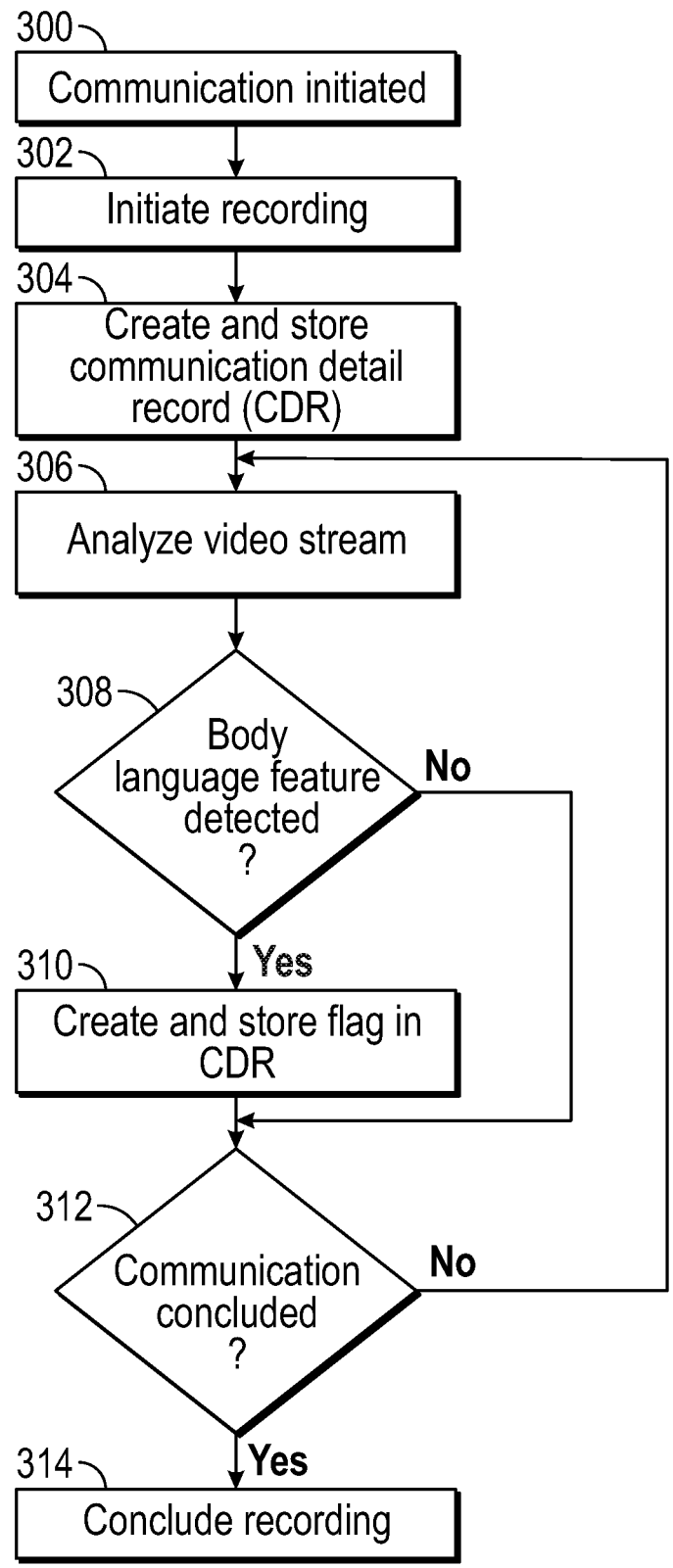
FIG. 3 is a flowchart of an example method for detecting body language features in a communication in accordance with some embodiments.

FIG. 3 illustrates an example method for detecting a body language feature in a communication in accordance with some embodiments. Features may be added to and/or omitted from the illustrated method in other embodiments. Further, the method may be performed in any logical order. For example, the method of FIG. 3 is described in the context of analyzing a communication while the communication is on-going; however, other examples may analyze the communication after the communication is concluded.

At operation 300, a communication is initiated. The communication is initiated through a communication processing system. For example, a resident can initiate a communication from a resident communication device to an outside communication device of a non-resident. The communication includes video conferencing, broadcasting, and/or other video communications.

At operation 302, recording of the communication is initiated. For example, the communication processing system may begin storing a copy of the communication in a database. At operation 304, a Communication Data Record (CDR) of the communication is created and stored. For example, the communication processing system may store the CDR in the same or different database in which the recording of the communication is stored. The CDR can include information as described above, include the recording and/or a reference to the recording.

At operation 306, a video stream of the communication is analyzed to detect a body language feature. Additionally, or alternatively, an audio stream of the communication is analyzed to detect an audio volume level change. The analysis can be performed by the communication processing system using any of the techniques described above, for example. At operation 308, a determination is made whether a body language feature was detected. If so, at operation 310, a flag is created and stored in the CDR. The flag can indicate that a body language feature and/or volume level change was detected, as described previously. The communication processing system can create and store the flag. The method then proceeds to operation 312. If, at operation 308, a body language feature and/or a volume level change was not detected, the method proceeds to operation 312.

At operation 312, a determination is made whether the communication has concluded. If the communication has not concluded, the method returns to operation 306, where the video stream and/or the volume level of the audio of the communication is analyzed. Hence, multiple instances of body language features and/or volume level changes can be detected in a communication, and multiple corresponding flags may be created and stored in the CDR. If the communication has concluded, the method proceeds to operation 314, where the recording of the communication is concluded and saved.

As described above, additional or alternative actions may be taken when body language features and/or volume level changes have been detected. For example, when a body language feature is detected in step 310, an alert may be sent to authorized personnel and/or the communication may be terminated. Other actions may be taken.

Further, with the CDR stored in a database, the database may be queried by authorized personnel to monitor communications and/or for investigative purposes. A flag stored in a CDR may make certain communications more easily identifiable, for instance, by querying the database, to monitor and/or investigate those communications. Additionally, with a recording of the communication, authorized personnel may have access to playback the communication to ascertain a better understanding of what was being communicated.

Figure 4:
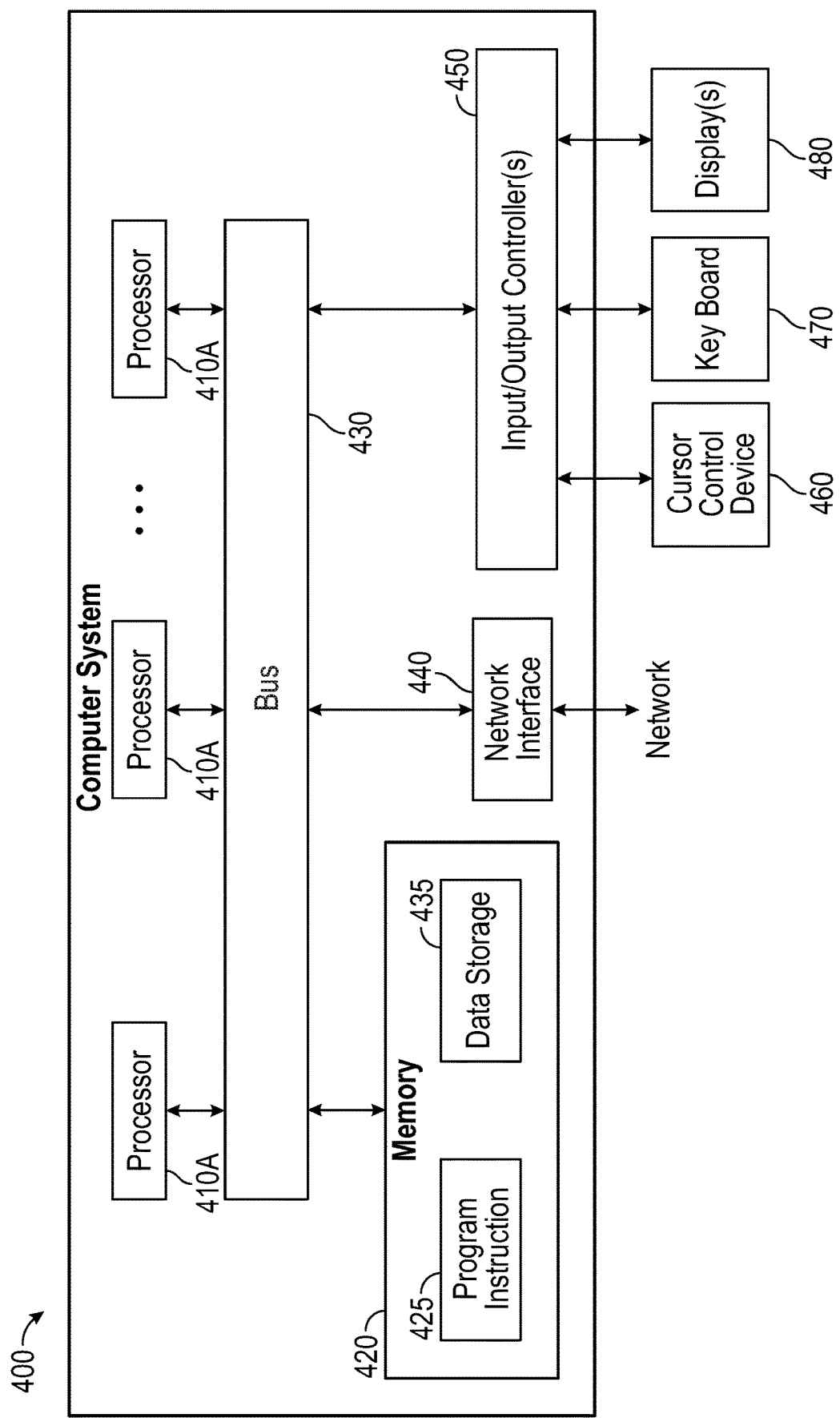
FIG. 4 is an example schematic of a computer system in accordance with some embodiments.

Some embodiments of systems and methods for detecting body language features in a communication, as described herein, may be implemented or executed, at least in part, by one or more computer systems. One such computer system is illustrated in FIG. 4. In various embodiments, computer system 400 may be a server, a mainframe computer system, a network appliance, a workstation, a network computer, a desktop computer, a laptop, a tablet, a handheld device, or the like. For example, in some cases, the communication processing system 101, smart terminal 103, personal computer wireless device 104, AMS 116, and monitoring system 118 shown in FIG. 1 may include at least one computer such as computer system 400. As explained above, in different embodiments these various computer systems may be configured to communicate with each other in any suitable way, such as, for example, via various networks.

As illustrated, computer system 400 includes one or more processors 410A-N coupled to a system memory 420 via bus 430. Computer system 400 further includes a network interface 440 coupled to bus 430, and one or more I/O controllers 450, which in turn are coupled to peripheral devices such as cursor control device 460, keyboard 470, display(s) 480, etc. Each of I/O devices 460, 470, 480 may be capable of communicating with I/O controllers 450, for example, via a wired connection (e.g., serial port, Universal Serial Bus port) or wireless connection (e.g., Wi-Fi, Bluetooth, Near Field Communications Link, etc.). Other devices may include, for example, microphones, antennas/wireless transducers, phone detection modules, etc.

In various embodiments, computer system 400 may be a single-processor system including one processor 410A, or a multi-processor system including two or more processors 410A-N (e.g., two, four, eight, or another suitable number). Processors 410 may be any processor capable of executing program instructions. For example, in various embodiments, processors 410 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 410 may commonly, but not necessarily, implement the same ISA. Also, in some embodiments, at least one processor 410 may be a graphics processing unit (GPU) or another dedicated graphics-rendering device.

System memory 420 may be configured to store program instructions and/or data accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. As illustrated, program instructions and data implementing certain operations and modules such as those described herein may be stored within system memory 420 as program instructions 425 and data storage 435, respectively. In other embodiments, program instructions and/or data may be received, sent, or stored upon different types of computer-accessible media or on similar media separate from system memory 420 or computer system 400.

A computer-accessible medium may include any tangible and/or non-transitory storage media or memory media such as electronic, magnetic, or optical media—e.g., disk or CD/DVD-ROM coupled to computer system 400 via bus 430. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 430 may be configured to coordinate I/O traffic between processor 410, system memory 420, and any peripheral devices in the computer system, including network interface 440 or other peripheral interfaces, such as I/O devices 460, 470, 480. In some embodiments, bus 430 may perform any necessary protocol, timing, or other data transformations to convert data signals from one component (e.g., system memory 420) into a format suitable for use by another component (e.g., processor 410). In some embodiments, bus 430 may include support for devices attached through various types of peripheral buses, such as a variant of the Peripheral Component Interconnect (PCI) bus standard or the Universal Serial Bus (USB) standard, for example. In some embodiments, the function of bus 430 may be split into two or more separate components, such as a northbridge chipset and a southbridge chipset, for example. In addition, in some embodiments some or all the functionality of bus 430, such as an interface to system memory 420, may be incorporated directly into processor(s) 410A-N.

Network interface 440 may be configured to allow data to be exchanged between computer system 400 and other devices attached to a network, such as other computer systems, or between nodes of computer system 400. In various embodiments, network interface 440 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 450 may, in some embodiments, enable communications with one or more display terminals, keyboards, keypads, touchpads, scanning devices, voice or optical recognition devices, mobile devices, or any other devices suitable for entering or retrieving data by one or more computer system 400. Multiple I/O controllers 450 may be present in computer system 400 or may be distributed on various nodes of computer system 400. In some embodiments, I/O devices may be separate from computer system 400 and may interact with one or more nodes of computer system 400 through a wired or wireless connection, such as over network interface 440.

As shown in FIG. 4, system memory 420 may include program instructions 425, configured to implement certain embodiments described herein, and data storage 435, comprising various data may be accessible by program instructions 425. In an embodiment, program instructions 425 may include software elements, which may be configured to affect the operations discussed in FIGS. 1 through 3. Program instructions 425 may be implemented in various embodiments using any desired programming language, scripting language, or combination of programming languages and/or scripting languages (e.g., C, C++, C#, Java™, JavaScript™, Perl, etc.). Data storage 435 may include data that may be used in these embodiments (e.g., recorded communications, profiles for different modes of operations, etc.). In other embodiments, other or different software elements and data may be included.

A person of ordinary skill in the art will appreciate that computer system 400 is merely illustrative and is not intended to limit the scope of the disclosure described herein. The computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

It should be understood that the various operations described herein, particularly in connection with FIGS. 1 through 3, may be implemented in software executed by processing circuitry, hardware, or a combination thereof. The order in which each operation of a given method is performed may be changed, and various operations may be added, reordered, combined, omitted, modified, etc. It is intended that embodiment(s) described herein embrace all such modifications and changes and, accordingly, the above description should be regarded in an illustrative rather than a restrictive sense.

The various systems and methods illustrated in the figures and described herein represent example embodiments. The methods may be implemented in software, hardware, or a combination thereof. The order in which each operation of a given method is performed may be changed, and various elements of the systems or devices illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

The invention claimed is:

1. A system, comprising:
a processor; and
a memory coupled to the processor, the memory having program instructions stored thereon that, upon execution by the processor, cause the system to:
  analyze a video communication between a first party and a second party while the communication is continuous and in real-time between the first party and the second party, the analysis configured to detect a plurality of body language features that indicate an event taking place during the communication, the body language features detected comprising:
    the first party leaning in toward a video camera;
    the first party changing stance;
    the first party's speed of movement being above or below a threshold value;
    the first party covering of a body part;
    first party's uncovering of a body part; and
    changes to the first party's pupil, eyebrow, or nostril; and
  create, in response to detection of one or more body language features in the event, an electronic record identifying the communication as containing the event, the electronic record including a classification of the one or more body language features in the event.

2. The system of claim 1, wherein the first party is a resident of a correctional facility, and wherein the second party is a non-resident of the correctional facility.

3. The system of claim 1, wherein the event is a communication that concerns criminal activity.

4. The system of claim 1, wherein when the detected body language feature includes the first party leaning in toward the video camera at a particular time during the communication, the electronic record identifies the particular time.

5. The system of claim 1, wherein when the detected body language feature includes the first party's changing stance at a particular time during the communication, the electronic record identifies the particular time.

6. The system of claim 1, wherein when the detected body language feature includes the first party's speed of movement being above or below a threshold value at a particular time during the communication, the electronic record identifies the particular time.

7. The system of claim 1, wherein when the detected body language feature includes the first party's covering of a body part at a particular time during the communication, the electronic record identifies the particular time.

8. The system of claim 1, wherein when the detected body language feature includes the first party's uncovering of a body part at a particular time during the communication, the electronic record identifies the particular time.

9. The system of claim 1, wherein when the detected body language feature includes changes to the first party's pupil, eyebrow, or nostril at a particular time during the communication, the electronic record identifies the particular time.

10. The system of claim 1, wherein execution of the program instructions by the processor, further cause the system to:
display information related to the communication to authorized personnel, the display comprising a call control area comprising controls enabling the authorized personnel to control the communication, the controls comprising:
  (i) a control to enable the authorized personnel to listen to the communication while being muted; and
  (ii) a control to enable the authorized personnel to barge into the communication to speak with one or more of the first party and second party.

11. The system of claim 10, wherein selection of the control to enable the authorized personnel to barge into the communication enables the authorized personnel to speak with one of the first party and second party and automatically mutes communications to the other of the first party and second party.

12. A method, comprising:
analyzing a video communication between a resident and a non-resident of a correctional facility while the communication is continuous and in real-time between the resident and the non-resident, the analysis configured to detect a plurality of body language features that indicate an event taking place during the communication, the body language features detected comprising:
the resident leaning in toward a video camera;
the resident changing stance;
the resident's speed of movement being above or below a threshold value;
the resident covering of a body part;
resident's uncovering of a body part; and
changes to the resident's: pupil, eyebrow, or nostril; and
creating, in response to detection of one or more body language features in the event, an electronic record identifying the communication as containing the event, the event concerning suspicious activity, and the electronic record including a classification of the one or more body language features in the event.

13. The method of claim 12, wherein the one or more body language features are detected at a particular time during the communication, and the electronic record identifies the particular time.

14. The method of claim 12, further comprising displaying information related to the communication to authorized personnel, the display comprising a call control area comprising controls enabling the authorized personnel to control the communication, the controls comprising:
    (i) a control enabling the authorized personnel to listen to the communication while being muted; and
    (ii) a control enabling the authorized personnel to barge into the communication to speak with the resident and/or non-resident.

15. The method of claim 14, wherein selection of the control to enable the authorized personnel to barge into the communication enables the authorized personnel to speak with one of the resident first party and the non-resident second party and automatically mutes communications to the other of the resident first party and the non-resident second party.

16. A hardware memory device having program instructions stored thereon that, upon execution by a computer system, cause the computer system to:
    analyze a video communication between a resident and a non-resident of a correctional facility while the communication is continuous and in real-time between the resident and the non-resident, the analysis configured to detect a plurality of body language features that indicate an event taking place during the communication, the body language features detected comprising:
    the resident leaning in toward a video camera;
    the resident changing stance;
    the resident's speed of movement being above or below a threshold value;
    the resident covering of a body part;
    resident's uncovering of a body part; and
    changes to the resident's: pupil, eyebrow, or nostril; and
    create, in response to detection of one or more body language features in the event, an electronic record identifying the communication as containing the event, the event concerning suspicious activity, and the electronic record including a classification of the one or more body language features in the event.

17. The hardware memory device of claim 16, wherein the one or more body language features are detected at a particular time during the communication, and the electronic record identifies the particular time.

18. The hardware memory device of claim 16, wherein execution of the program instructions by the computer system, further cause the computer system to:
    display information related to the communication to authorized personnel, the display comprising a call control area comprising controls enabling the authorized personnel to control the communication, the controls comprising:
    (i) a control to enable the authorized personnel to listen to the communication while being muted; and
    (ii) a control to enable the authorized personnel to barge into the communication to speak with the resident and/or the non-resident.

19. The hardware memory device of claim 18, wherein selection of the control to enable the authorized personnel to barge into the communication enables the authorized personnel to speak with the resident or the non-resident and automatically mutes communications to the other of the resident or non-resident.

* * * * *